United States Patent Office 3,445,406
Patented May 20, 1969

3,445,406
PROCESS FOR ELASTICIZING FOAMED POLY-
STYRENES AND RESULTANT PRODUCT
Hermann Koch, Gellertstrasse 12, Hannover, Germany
Filed Aug. 9, 1965, Ser. No. 478,450
Claims priority, application Germany, Aug. 10, 1964,
K 53,707
Int. Cl. C08f 47/08, 47/22
U.S. Cl. 260—2.5         10 Claims

ABSTRACT OF THE DISCLOSURE

Process for modifying the properties of foamed polystyrenes produced with the aid of a gas developed at an elevated temperature wherein the foamed product is cooled down directly after the foaming operation at least to room temperature sufficiently quickly that the pressure within the cells of the solid foamed product produced is subatmospheric and subsequently compressing such cooled product at a pressure of at least 2 kg./cm.$^2$ before diffusion of the atmosphere therein can cause a substantial increase in the pressure within the foamed product.

---

Figure 1:
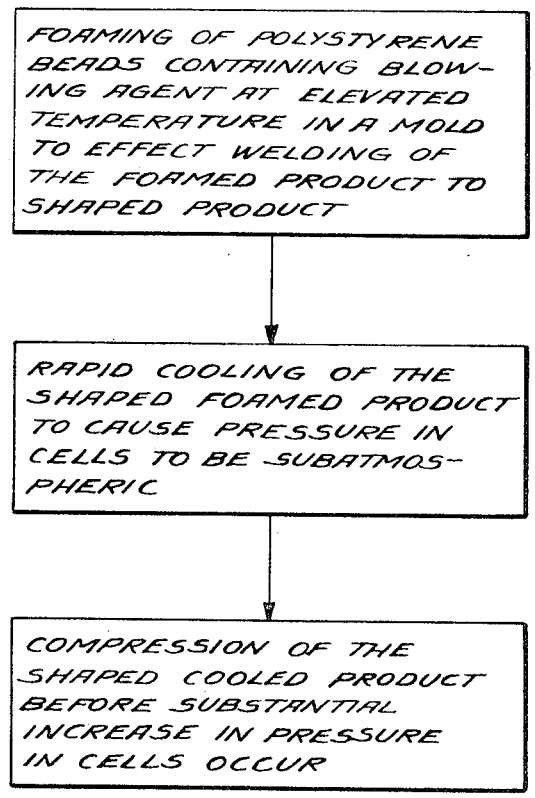

The invention relates to a process for the modification, especially the elasticizing, of foamed polystyrenes which have been produced by procedures known per se with the aid of low boiling blowing agents and/or gas liberating assistants in the thermoplastic range of such resin.

Foams or respectively cellular structures of resins are produced today in very large quantities. Depending upon the resin and procedure employed for their manufacture, as well as the type of cell structure attained, hard, soft and elastic foamed materials can be obtained. They, for example, can be produced directly during the production of the resins by the chemical reaction of certain additions. One can, however, work gases into the high molecular weight resins under pressure which then blow up the resin into the form of a foam when the pressure is released at a temperature within the thermoplastic range of the resin. A further possibility for the production of foamed products consists in the addition of blowing agents, which become active under suitable conditions, to resin containing starting mixtures such as, for example, polyvinyl chloride containing plastisols.

In the production of foamed thermoplastic resins, in some instances low boiling, inert substances are used as blowing agents. Such blowing agents can be mixed with such thermoplastic resins, if necessary, under pressure, and upon softening of such thermoplastic during processing at higher temperatures than vapor pressure will expand the thermoplastic to foamed products.

Many expanded products, for example, are produced from polystyrene by this procedure, preferably with the aid of low boiling hydrocarbons as the blowing agent. The unfoamed starting material containing the blowing agent is commercially available in the foam of beads or granules. The processing thereof, as a rule, first involves a prefoaming step, in which such starting material is first given a heat treatment, for example, with hot air, steam or preferably a hot water bath, to foam such material to a predetermined limited degree to produce a desired bulk density. This more or less voluminous prefoamed material is then stored after cooling and drying, if necessary, before it is used in the production of the final desired shaped products. Storage periods of ½ to 6 days, depending upon the degree of prefoaming, are considered necessary to permit an equalization between the conditions outside of the prefoamed granules and those within the interior thereof and to assure that sufficient final foaming of the granules can be achieved during the final shaping by the remaining blowing agent therein and the air which has diffused into the granules during the storage. Shorter intermediate storage periods are only possible if the prefoamed material has been prefoamed to an apparent (powder) density of 100 g./dm.$^3$ or more.

The stored prefoamed material, the apparent (powder) density of which to some extent determines the density of the final foamed product, is poured in suited molds (with vibration, if desired) and subjected to a further heat treatment to effect the final foaming and shaping. With smaller molds it is usual to use a water bath for the heat treatment and with larger molds it is usual to use steam.

During the final foaming the prefoamed particles expand against each other and weld at the grain boundaries. After cooling a solid cellular structure is obtained, the dimensions of which correspond to those of the mold used. The densities of the foamed final products can be varied between about 0.015 and 0.3, depending upon the bulk density of the prefoamed material and the degree the molds are filled prior to the final foaming.

In addition to the above described discontinuous process, a number of continuous processes have been developed recently for the production of sheets or plates of foamed polystyrene. In such processes the plasticized material is extruded from slot dies or the sheet blowing procedure can be used observing the special technical machine and process conditions required.

The polystyrene foams which have been produced have found many uses because of their lightness and good insulating properties. However, they also possess some properties which limit their use or even render their use impossible for certain purposes.

As a rule polystyrene foams when in large cross-section and also sometimes when in small cross-section are only of very low flexibility or elasticity and easily break when subjected to strong bending stresses. This is especially true for materials with high densities. It has been made possible to use foamed polystyrene for the production of relatively small shaped products in which a certain flexibility and elasticity is required by using prefoamed material with a very small uniform particle size and a very definite degree of prefoaming. This, for example, has rendered it possible to produce foamed styrene drinking cups having the necessary bending elasticity with simultaneous stability of shape.

In addition, the foamed structure of the usual polystyrene foamed products is very loose and the surfaces thereof when not given a special sheet or veneer coating are very easy to dent and damage. Whereas the surfaces of directly foamed shaped products and plates which were foamed on the mold walls are relatively smooth and dense, in the long run the material in cut plates or cut shaped structures crumble easily under mechanical and especially under frictional stresses. With constant mechanical stress reversal the material can be permanently compressed or pulverized.

The bonding of polystyrene foams with other materials, such as, sheets, plates, fabrics and the like, produces difficulties insofar as the foam structure, especially, at cut surfaces with open cell structure, is especially sensitive to organic solvents. As a consequence, special adhesives and/or special bonding procedures must be employed in order to prevent destruction of the foam structure and collapse of the material during the bonding operation. Furthermore, the removal of adhesively bonded covering sheets, even when good bonds have been achieved, is easily possible because of removal of the foamed layer below the covering sheet along with the sheet.

Some of these disadvantages are not as severe in extruded foamed material. This is especially so when considering the elasticity and bendability of thin layers. This behavior, however, is not uniform in all directions of the material. It appears to be caused by an orientation of the material in the extrusion or blowing direction which in some instances is disadvantageous for the material.

An elastification of cellular material based on styrene, especially against the influences of pressure, can be obtained by free foaming of pressed or presintered blocks or plates of unfoamed but blowing agent containing polystyrene beads or granulates in hot air or steam with subsequent free shrinking of the highly foamed products upon cooling. However, plates or blocks produced in this manner while having a good compression elasticity always have a wavy surface which, depending upon the grain structure, is also rough. The specific weight is low and the mechanical resistance is low. The blocks or plates must in every instance be cut to provide exactly dimensioned and level surfaces and they have an open, easily damaged surface layer. The bending elasticity, however, is better than that of normal foamed polystyrene.

A similar effect and a similar elastic material can easily be obtained by giving foamed blocks or plates an afterfoaming treatment in steam or hot air with subsequent free cooling.

When foamed polystyrene plates or blocks produced by the above described usual processes are compressed to about ½ their volume between pressure plates or rolls one obtains a material after release of the pressure which has a 20 to 30% higher density than that of the starting material and which also within certain limits possesses bending elasticity. In thicker layers, however, the material is still friable upon being subjected to energetic bending stresses. Higher compressions than indicated above cannot be attained with polystyrene foams produced according to previously known methods.

According to the invention it was found that a polystyrene based cellular material having extraordinary bending elasticity and simultaneously having good compression elasticity could be produced by a special suited combination of process steps from polystyrene foams which were produced with the aid of low boiling blowing agents and/or other gas producing assistants in the thermoplastic temperature range of polystyrene when one foams the blowing agent containing polystyrene starting material, which, if desired, has already been prefoamed, according to known procedures with the aid of heat, in molds or containers under pressure or also with the use of pressure differences and then directly thereafter cools the foamed product rapidly, preferably in a water bath at least to room temperature and then within two hours after such cooling down and preferably immediately after such cooling down compresses the foamed product at a pressure of at least 2 kg./cm.$^2$ and preferably at a pressure between 5 and 30 kg./cm.$^2$. The products according to the invention preferably are of relatively high density.

Figure 2:
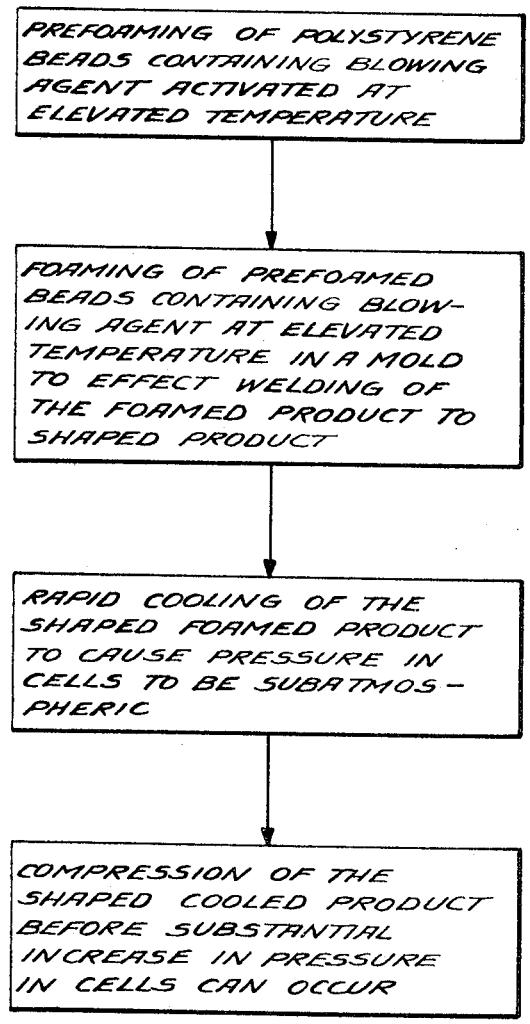

In the accompanying drawings:

FIG. 1 is a flow sheet of one embodiment of the process according to the invention; and FIG. 2 is a flow sheet of a modification of the process according to the invention wherein the polystyrene is prefoamed before molding.

The materials obtainable according to the invention are corklike and have a cellular structure irrespective of the type of starting polystyrene material and also irrespective of the grain size distribution of the prefoamed material if such is used. The density of such materials depends on the pressure used in their compression as well as the degree of foaming employed in the pre- and/or final foaming. The process according to the invention can be carried out with polystyrene foamed beads which are produced by the known discontinuous prefoaming processes in a hot air, steam or hot water bath or also with shaped structures of cellular polystyrene which, for example, have been produced continuously in the form of bands or profiles by extrusion of suited mixtures.

It has been found especially expedient to employ prefoamed or polystyrene materials for the process according to the invention. Any degree of prefoaming can be employed for such prefoamed materials. However, insofar as could be ascertained up until now, the best results are obtained in the final products when the prefoamed material has an apparent (powder) density of 30 to 150 g./liter.

The prefoamed material must be processed as quickly as possible after being prefoamed and cannot, contrary to previous viewpoints concerning the production of foamed polystyrene products, be subject to long intermediate storage before the final foaming is effected. The further processing expediently should occur within 2 hours and at most not later than 6 hours after the prefoaming in order that the gas exchange or the equalization of the pressure differences between the outside atmosphere and the interior of the prefoamed granules is maintained as little as possible. When a substantial portion of the vacuum occurring within the granules upon cooling down after the prefoaming is equalized by the entrance of air, elastification of the end product cannot be obtained to its fullest extent by the compression of the final foamed product. A noticeable deterioration of the desired products in the end product already occurs when a prefoamed material is employed which has been subject to an intermediate storage period of 4–5 hours.

It is not necessary that the particles which have been prefoamed in steam or a water bath be dried before the final foaming. Unless drying is desired to provide for better flow and mold fitting characteristics, for which drying with warm air for a short time at a maximum of 50° C. is expedient, usually rough centrifuging suffices. With very moist material it is possible to lengthen the intermediate storage periods, especially when a closed water film is retained which is sufficiently thick to prevent a gas exchange between the atmosphere and the interior of the grains.

Prefoamed material which has been stored too long in which a certain loss of the vacuum within the grains has taken place may still be used when minor quantities thereof are used in admixture with fresh prefoamed material.

For the final foaming operation, the prefoamed material, for example, in the form of beads, granules or the like, are introduced into molds, as usual, and subjected to foaming temperatures between about 85 and 110° C. The heating is effected in the usual manner with heating mediums, such as, steam, hot air or hot water or with dielectric or induction heating. When the individual molds used for the final foaming are not too large, it is advantageous for reasons of economy to use hot water baths through which the molds filled with the prefoamed material are passed on chains or upon bands.

As has already been indicated, the degree of prefoaming and therefore the bulk density of the prefoamed material is of great significance for the density and other mechanical properties of the end product. To some extent this is also true of the grain size distribution upon which the apparent (powder) density is dependent. In addition, the welding of the foamed particles as well as the mechanical strength of the final foamed product is influenced by the degree to which the molds are filled with the prefoamed material and the interior pressure caused by the gasification of the remaining blowing agent in the final foaming operation. A mold filling which is too small only provides low pressures and a very loose end product which is of low strength and which after the following compression easily breaks apart and possesses little elasticity. A high degree of mold filling with the prefoamed material produces shaped structures which already before compression have a high density similar to that of the prefoamed material and a good welding of the particles as well as a higher bending strength.

The time required for the final foaming as is known depends upon the thickness of the layer to be foamed, the heating method employed and the temperature employed. They are easily ascertained by preliminary tests.

According to the invention the foamed polystyrene material obtained after the final foaming operation is cooled down at least to room temperature as rapidly as possible. In discontinuous operations, this object is expediently attained by cooling the molds in a cold water bath as soon as they are removed from the heating medium such as a hot water bath. This to a certain extent causes "freezing" of the foamed condition and prevents collapse of the foam.

The foamed polystyrene product is subjected to compression at a pressure of more than 2 kg./cm.$^2$, preferably about 5 to 30 kg./cm.$^2$, before diffusion of atmospheric air can cause loss of the vacuum formed within the foamed product by the cooling down of the blowing gas. Such compression should preferably be effected within about the first 2 hours after the foamed product has been removed from the cooling bath and still better is effected as soon as possible within the first half hour. Expediently the compression is effected before the water on the foamed product from the cooling bath has dried. The degree of compression depends upon the starting density and the pressure employed. Usually the reduction in volume amounts to at least 50 to 70%.

The compression can be effected in the molds used for the final foaming if they are also constructed as compression molds. The compression, however, can also be effected after the foamed product has been removed from the molds with the aid of plain or profiled rolls, when, for example, blocks or sheets are concerned, or with the aid of discontinuously operating compression molds. It is possible in this processing step to effect two or three dimensional deformations within certain limits as well as the stamping or embossing of the surface structures. It is also possible according to the invention to provide the foamed products during or after the compression step with or without the aid of assistances with surface coverings such as plastic films, metal foils, veneers, paper, woven or knitted fabrics or fleeces or the like if such surface covering had not already been attained directly during the foaming operation by lining the molds with the corresponding sheet material.

Plates and bands of the modified or elasticized polystyrene foam according to the invention can also be produced in a continuous process, for example, prefoamed material is continuously supplied to a channel delimited by moving perforated bands, heated, for example, with hot air, expanded and welded together in such channel, the channel being more or less tightly closed in the direction of motion so that a pressure build up is effected in the heating and expansion zone. Following passage through the heating and expansion zone the material is cooled to solidify the foam structure. Immediately after the cooled foamed band is ejected from the channel it is compressed between rollers.

It is also possible to produce plates or bands from larger foamed bodies such as, for example, blocks or cylinders by separating bands or plates from such larger foamed bodies immediately after or during the cooling and such separated bands or plates are compressed as soon as possible, for example, by passage between rollers. The separation may be effected with the aid of saws, band knives or heated wires. The total time required for cooling down a large cylindrical foamed body can be reduced considerably if a cooled surface layer is continuously peeled off therefrom. The peeling velocity and the cooling, however, must be so adjusted that a sufficiently thick stable cooled outer layer is always present on the cylinder that it can resist the pressure still existing within the hot interior of the cylinder so that such outer layer is not ripped or distended.

The process according to the invention can also be used with particular advantage on foamed polystyrene sheets or plates produced by the known continuous extrusion processes, which, as has been indicated above, often can possess a certain directionally oriented elasticity and flexibility. In this case the foamed band is either cooled down immediately after the extrusion and thereafter immediately compressed or immediately subjected to an afterfoaming treatment in a hot water, steam or hot air bath, followed by immediate cooling and compression. Such procedure is easily carried out continuously.

The time required for cooling the foamed material before the compression step depends upon the thickness and the surface of the shaped body (which essentially is an insulating material). The cooling expediently is effected in a cold water bath and the cooling time required for the final foaming operation.

For all embodiments of the process according to the invention the starting polystyrene as well as the prefoamed intermediate products can be provided in a manner know per se with modifying additions, such as plasticizers, dyes, fillers and the like, either by direct incorporation therein or by coating. The incorporation of additions which reduce or prevent flammability, such as halogenated plasticizers, phosphoric acid esters, antimony compounds and the like is of special significance. Cellular shaped products of this type of material above all find use in the building and automotive industries.

A further possibility for modifying the process according to the invention is by the addition of other foamable or foamed thermoplastic polymers or copolymers to the starting polystyrene or prefoamed polystyrene. These additions only must become thermoplastic and be capable of foaming in about the same temperature range as the polystyrene and also possess the ability to weld with the polystyrene at these temperatures. The substances or mixtures of substances which can be used as blowing agents for such other polymers are the same or similar to those used for the polystyrene. Copolymers of styrene, such as, the copolymers of styrene and butadiene or of styrene and acrylonitrile and the like and copolymers of acrylic and methacrylic esters, of vinyl acetate, vinyl chloride and the like are, for example, suited as such other polymers. The mechanical strength and the thermal stability of the foamed products can be simultaneously influenced by such additions.

In addition, reenforcing embedments, such as, fabrics, nets and the like of metal, glass, resin, or other fibers such as used in textiles can be embedded in the shaped bodies produced during the final foaming operation. The resulting compound or laminated materials have additional bending stiffness. In a similar manner it is also possible to bond surface layers, such as woven fabrics, knitted fabrics, nettings, sheet material and the like during the final foaming operation to obtain certain surface effects and surface properties suitable for certain uses.

The foamed polystyrene products obtained in accordance with the invention in addition to exhibiting excellent bending and compression elasticity as well as bending strength also possess other very good mechanical properties. For example, in contrast to foamed products of high density produced by the previously known processes, they possess improved impact strength (both with notched and unnotched specimens) as well as improved tearing strength. They can be used as facings, preferably in conjunction with bonded surface layers, or also was structural carrying elements. In the latter instance it is advisable to incorporate strengthening and supporting structures. The materials have sound deadening and noise reducing properties and also can be used as insulation against heat and cold. The noninflammable and reduced flammable forms as well as those of temperature stable polystyrene types have special advantages.

The adhesive bonding, lamination or coating of the foamed polystyrene products according to the invention, in contrast to the previously known foamed products of this type of polymers, is also possible with the usual solvent adhesives without causing any reel damage to the foam structure.

The following example will serve to illustrate the process according to the invention.

EXAMPLE

Blowing (low boiling hydrocarbon, B.P. about 60–70° C.) agent containing polystyrene (a commercial product available under the designation Styropor P) which was in the form of beads of a diameter between 0.2 and 3 mm. was prefoamed for 3 minutes in an open water bath at 80–83° C. (The resulting prefoamed material had an apparent (powder) density of 92 g./l. when measured dry.)

After the prefoamed polystyrene beads were removed from the hot water bath, the adhering water was largely removed by centrifuging. After about one hour the prefoamed polystyrene beads which were still moist, were placed in a plate mold provided with a number of small perforations on its upper and lower surface. After closure of the mold the contents were foamed at 100° C. for 13 minutes and the mold and contents then cooled in running water. The resulting foamed polystyrene plate was then compressed in the direction of its smallest dimension at a pressure of 15 kg./cm.$^2$. A period of one hour and forty-five minutes elapsed between the final foaming operation and the compression. The density of the compressed product (after release of the pressure) was 290 g. per liter. The bending strength thereof measured according to DIN 53452 was 54 kg./cm.$^2$, the impact strength (with unnotched specimen) was 5.1 kg./cm.$^2$ and with notched specimen was 3.5 kg./cm.$^2$ (both measured according to DIN 53453).

I claim:

1. A process for modifying the properties of foamed shaped polystyrene product produced with the aid of a gas developed by a blowing agent at an elevated temperature within the thermoplastic range of the polystyrene which comprises cooling down the foamed shaped polystyrene product directly after the foaming operation at least to room temperature sufficiently quickly that a solid foamed shaped product in which the pressure in the cells of the foam has been rendered subatmospheric by the cooling down of the gas developed by the blowing agent is produced and subsequently compressing such cooled foamed polystyrene at a pressure of at least 2 kg./cm.$^2$ before diffusion of the atmosphere therein can cause substantial increase in the pressure within the foamed product.

2. The process of claim 1 in which the pressure employed for the compression is between about 5 and 30 kg./cm.$^2$.

3. A process for modifying the properties of foamed shaped polystyrene product produced by prefoaming particulate polystyrene with the aid of a gas developed by a blowing agent at an elevated temperature within the thermoplastic range of the polystyrene to produce prefoamed particles still containing active blowing agent and subsequently foaming the prefoamed particles in contact with each other with the aid of a gas developed by the blowing agent retained therein at an elevated temperature within the thermoplastic range of the polystyrene to form a foamed shaped product in which the particles are welded together which comprises cooling down the foamed shaped polystyrene product directly after the last mentioned foaming operation at least to room temperature sufficiently quickly that a solid foamed shaped product in which the pressure in the cells of the foam has been rendered subatmospheric by the cooling down of the gas developed by the blowing agent is produced and subsequently compressing such cooled foamed polystyrene at a pressure between about 5 and 30 kg./cm.$^2$ before diffusion of the atmosphere therein can cause substantial increase in the pressure within the foamed product.

4. The process of claim 3 in which the prefoamed polystyrene has a bulk density between about 30 to 150 g. per liter and such prefoamed polystyrene is subjected to the last mentioned foaming operation within 6 hours after the prefoaming operation.

5. The process of claim 4 in which such prefoamed polystyrene is subjected to the last mentioned foaming operation within 2 hours after the prefoaming operation.

6. The process of claim 4 in which the prefoamed polystyrene is cooled down with water and said last mentioned foaming operation is carried out with such prefoamed polystyrene while it is still moist from the cooling water.

7. The process of claim 1 in which the compression of the foamed polystyrene is effected within at most 2 hours after it has been cooled down.

8. The process of claim 1 in which the cooled solid foamed product is cut to produce at least one foamed piece having at least one dimension smaller than the foamed product from which it is cut and such cut foamed piece is subjected to the compression.

9. A shaped foamed polystyrene product produced by the process of claim 1.

10. A shaped foamed polystyrene product produced by the process of claim 3.

References Cited

UNITED STATES PATENTS

| | | | |
|---|---|---|---|
| 2,744,291 | 5/1956 | Stastny et al. | 264—53 |
| 2,795,008 | 6/1967 | Lindemann et al. | 264—54 |
| 2,816,827 | 12/1957 | Roth. | |
| 3,056,753 | 10/1962 | Fronko. | |

PHILIP E. ANDERSON, *Primary Examiner.*

U.S. Cl. X.R.

264—53, 237, 321